(12) United States Patent
Schilling

(10) Patent No.: US 6,692,055 B2
(45) Date of Patent: Feb. 17, 2004

(54) LOADING RAMP ANCHOR BAR

(75) Inventor: Harold M. Schilling, Mosinee, WI (US)

(73) Assignee: HMS Lift, LLC, Mosinee, WI (US)

( * ) Notice: Subject to any disclaimer, the term of this patent is extended or adjusted under 35 U.S.C. 154(b) by 0 days.

(21) Appl. No.: 10/219,554

(22) Filed: Aug. 15, 2002

(65) Prior Publication Data

US 2003/0071476 A1 Apr. 17, 2003

Related U.S. Application Data

(63) Continuation-in-part of application No. 60/312,407, filed on Aug. 15, 2001.

(51) Int. Cl.$^7$ .............................................. B62D 25/00
(52) U.S. Cl. ....................... 296/61; 296/26.11; 419/537
(58) Field of Search ........................ 296/61, 57.1, 50, 296/26.11, 3; 14/69.5, 71.3; 414/537, 545; 410/110, 106

(56) References Cited

U.S. PATENT DOCUMENTS

| | | | |
|---|---|---|---|
| 3,510,015 A | | 5/1970 | Roshaven |
| 3,737,058 A | | 6/1973 | Johnson |
| 3,756,440 A | * | 9/1973 | Raap et al. .................... 296/61 |
| 4,003,483 A | * | 1/1977 | Fulton ........................ 296/61 |
| 4,527,941 A | * | 7/1985 | Archer ........................ 296/61 |
| 4,571,144 A | * | 2/1986 | Guidry et al. .............. 414/537 |
| 4,700,421 A | | 10/1987 | Gladney et al. |
| 4,884,838 A | | 12/1989 | Slater |
| 4,923,360 A | | 5/1990 | Beauchemin |
| 5,035,565 A | | 7/1991 | White |
| 5,156,432 A | * | 10/1992 | McCleary .................... 296/61 |
| 5,211,437 A | * | 5/1993 | Gerulf ........................ 296/61 |
| 5,380,145 A | * | 1/1995 | Czaplewski ................. 414/537 |
| 5,540,474 A | * | 7/1996 | Holland ....................... 296/61 |
| 5,649,732 A | * | 7/1997 | Jordan et al. ................. 296/61 |
| 5,768,733 A | | 6/1998 | Kneebone |
| 5,769,593 A | | 6/1998 | Buffaloe |
| 5,813,714 A | * | 9/1998 | Lipinski et al. .............. 296/61 |
| 5,938,397 A | * | 8/1999 | Schouest ................... 414/537 |
| 5,971,465 A | * | 10/1999 | Ives et al. ..................... 296/61 |
| 6,059,344 A | | 5/2000 | Radosevich |
| 6,158,798 A | * | 12/2000 | Stedtfeld et al. .............. 296/61 |
| 6,227,593 B1 | * | 5/2001 | De Valcourt ................. 296/61 |
| 6,250,874 B1 | * | 6/2001 | Cross ......................... 296/61 |
| 6,338,515 B1 | * | 1/2002 | Munhall .................... 296/26.1 |
| 6,340,190 B1 | * | 1/2002 | Rosebrugh et al. ......... 296/57.1 |
| 6,378,926 B1 | * | 4/2002 | Renze et al. ............. 296/26.11 |
| 6,378,927 B1 | * | 4/2002 | Parry-Jones et al. .......... 296/61 |
| 6,527,326 B2 | * | 3/2003 | Henderson .................... 296/61 |
| 6,575,516 B2 | * | 6/2003 | Webber ........................ 296/61 |
| 2002/0172584 A1 | * | 11/2002 | Huggins ...................... 296/61 |
| 2003/0000980 A1 | * | 1/2003 | Muizelaar et al. ......... 296/37.1 |
| 2003/0015885 A1 | * | 1/2003 | Landwehr .................... 296/61 |
| 2003/0127873 A1 | * | 7/2003 | Reed ....................... 296/26.08 |

* cited by examiner

Primary Examiner—Kiran Patel
(74) Attorney, Agent, or Firm—Wood, Phillips, Katz, Clark & Mortimer

(57) ABSTRACT

A ramp anchor for a truck tailgate has an anchor bar which rests on the outer edge of the horizontal upper surface of the tailgate in its lowered position. End pieces pivoted to the anchor bar engage tailgate latches below the anchor bar. The bar has telescoped sections to adjust the bar length. A square bar has end pieces adjustable about axes at right angles to the upper surface of the tailgate. A round bar has end pieces adjustable about the bar axis.

17 Claims, 3 Drawing Sheets

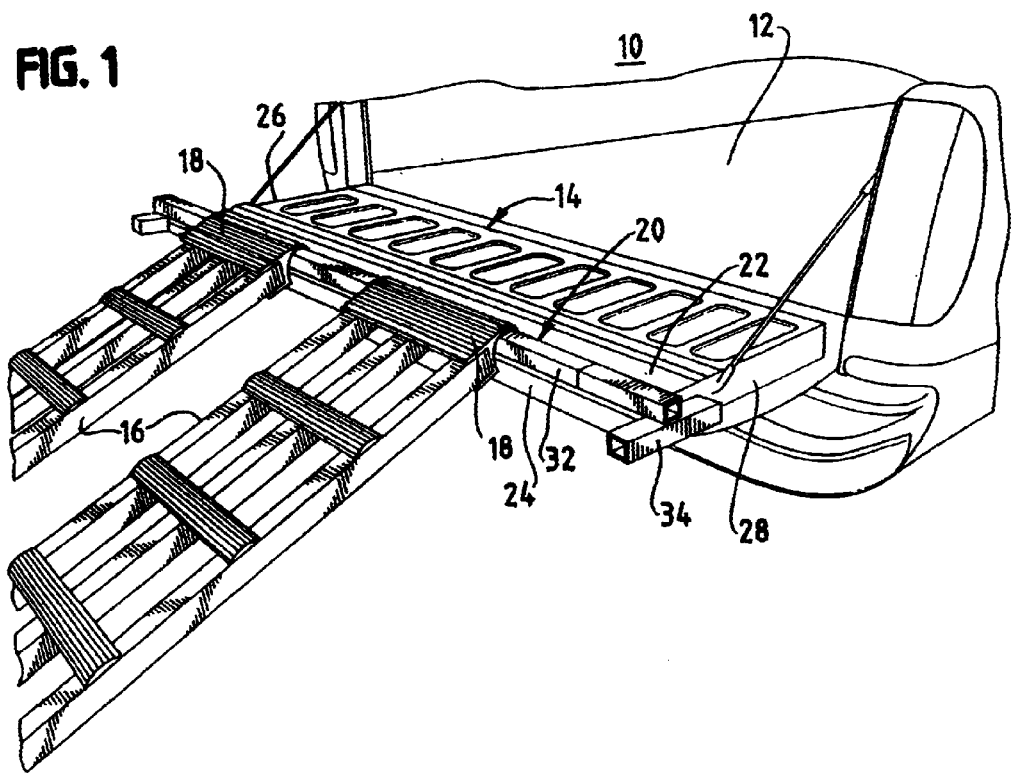
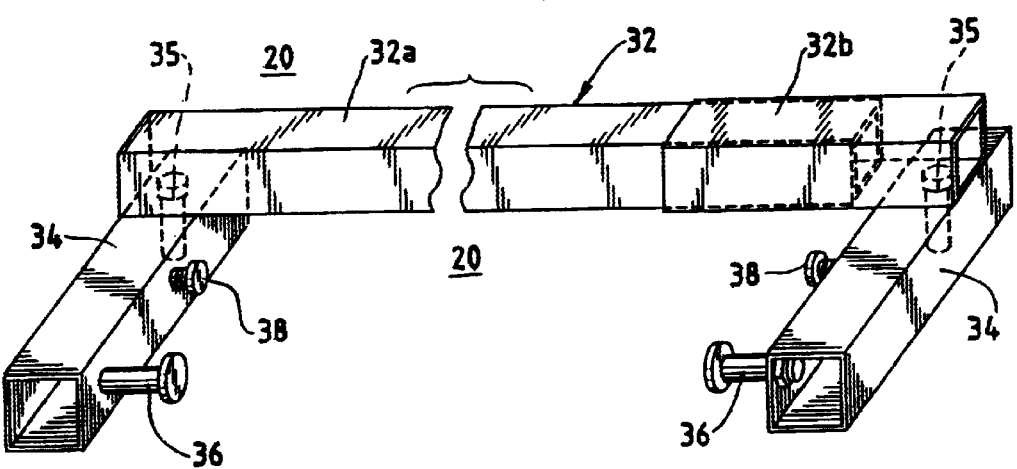

LOADING RAMP ANCHOR BAR

CROSS REFERENCE TO RELATED APPLICATION

This application is a continuation in part of my application Ser. No. 60/312,407 filed Aug. 15, 2001.

BACKGROUND OF THE INVENTION

This invention is concerned with an anchor for a ramp used in loading a truck, as a pickup truck. The anchor comprises a bar which is mounted on the edge of the upper surface of the lowered truck tailgate. Ives et al. U.S. Pat. No. 5,971,465 shows an anchor comprising an angle iron stem member fitted to the edge of a lowered tailgate with an anchor rod secured to and extending outwardly of the angle iron. The invention eliminates the stem member and provides an anchor rod mounted directly to the outer edge of the upper surface of a lowered tailgate.

BRIEF DESCRIPTION OF THE INVENTION

One feature of the ramp anchor is a bar to rest on the upper surface of the tailgate along the outer edge, for engagement by a hook on a ramp, with end pieces at each end of and extending below the anchor bar along the ends of the tailgate for engagement with the tailgate latches.

Another feature of the ramp anchor is that the bar is adjustable in length to accommodate tailgates of various widths.

A further feature of the ramp anchor is that the bar comprises telescoped tube sections of square or round cross section.

Yet another feature is that the end pieces are adjustable in length to position the bar at the outer edge of the upper surface of the lowered tailgate.

BRIEF DESCRIPTION OF THE DRAWINGS

Further features and advantages of the invention will be apparent from the following description and from the drawings in which;

FIG. 1 is a perspective view of a trunk tailgate with one embodiment of the ramp anchor installed;

FIG. 2 is a perspective view of the ramp anchor of FIG. 1;

DETAILED DESCRIPTION OF THE INVENTION

Figure 3:
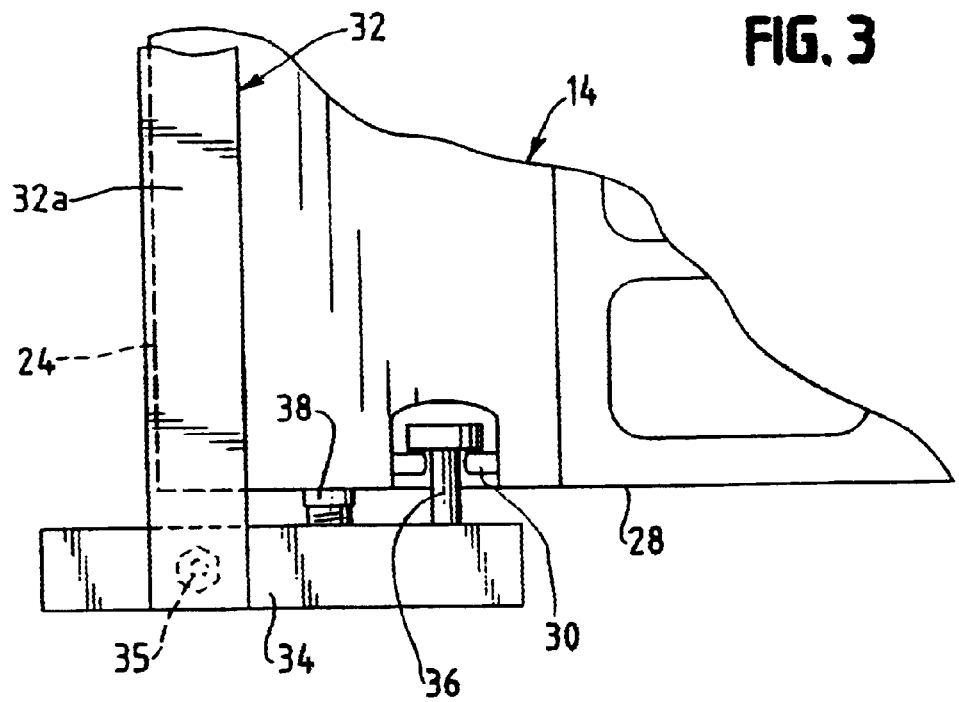
FIG. 3 is a fragmentary plan view of a corner of the truck tailgate with the ramp anchor of FIGS. 1 and 2 installed.
Figure 4:
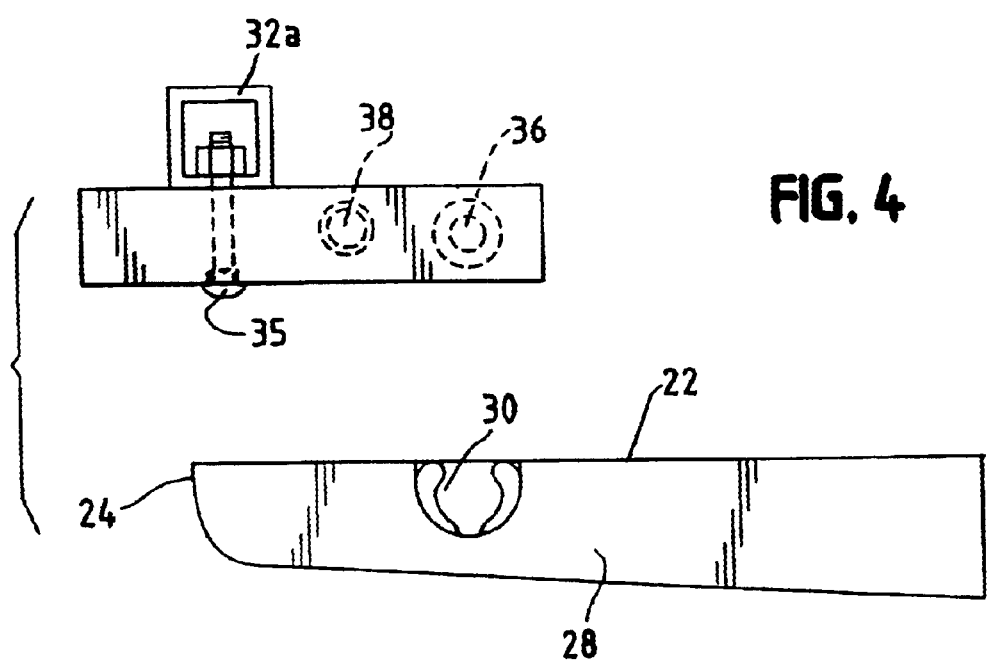
FIG. 4 is an exploded end view of the tailgate and anchor of FIG. 3.

A truck 10, as a pickup truck, has a bed 12 closed at the rear by a hinged tailgate 14, shown in FIG. 1 in the lowered, substantially horizontal, position. To move a load, as a wheeled vehicle into and out of the truck bed, ramps 16 extend from the tailgate 14 to the ground (not shown). A hook 18 at the upper end of each ramp 16 extends over a ramp anchor 20 providing a secure connection so that the ramps are not easily dislodged during loading and unloading of the truck.

Tailgate 14, in the lowered position illustrated, has an upper surface 22 which is substantially horizontal. The outer edge 24 of the tailgate, the upper edge when the tailgate is raised, is bounded by the ends 26, 28 of the tailgate. The tailgate is provided with latches which secure it in the raised or closed position. A pin latch mechanism 30 is shown at the end 28 of the tailgate FIG. 3. A similar mechanism is provided at the other end 26 of the tailgate. The pins with which the latches engage to hold the tailgate in raised position are not shown.

Ramp anchor 20 comprises a square, tubular bar 32 which rests on and extends above the upper surface of tailgate 14 along the outer edge 24. The width of the tailgate for typical pickup trucks may differ by 8 to 10 inches. Accordingly, anchor bar 32 comprises two telescoped sections 32a, 32b so that the bar is adjustable in length to fit the width of the tailgate of the truck with which it is used.

Square, tubular end pieces 34 are connected below the ends of bar 32 to pivot on bolts 35 about axes which are at a right angle to the tailgate surface when the anchor is installed on the tailgate. The end pieces 34 are below the tailgate surface and extend along the ends 26, 28 of the tailgate. Each end piece has a latch pin 36 extending inwardly from the end piece and spaced from bar 32, to be received in the tailgate latch 30. An adjustable stop 38 is threaded to the end piece between bar 32 and latch pin 36 and is adjusted to engage tailgate end surface 28, FIG. 3.

The ramp anchor 20 is easily installed on the lowered tailgate and is locked in place by closing tailgate latches 30. Ramps 16 are then hooked over anchor bar 32 and are ready for use. When the loading or unloading operation is completed ramps 16 are removed, the tailgate latch is released and the anchor may be removed.

Figure 5:
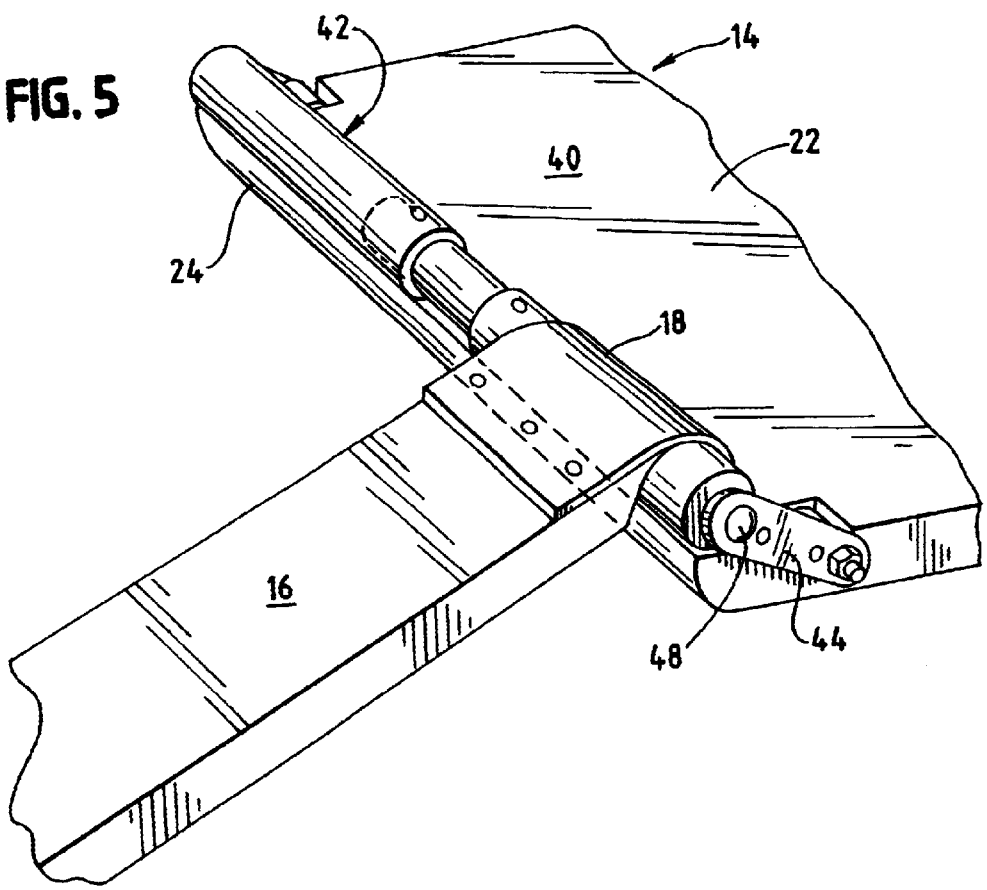
FIG. 5 is a perspective view of a truck tailgate with a second and preferred embodiment of the ramp anchor installed.
Figure 6:
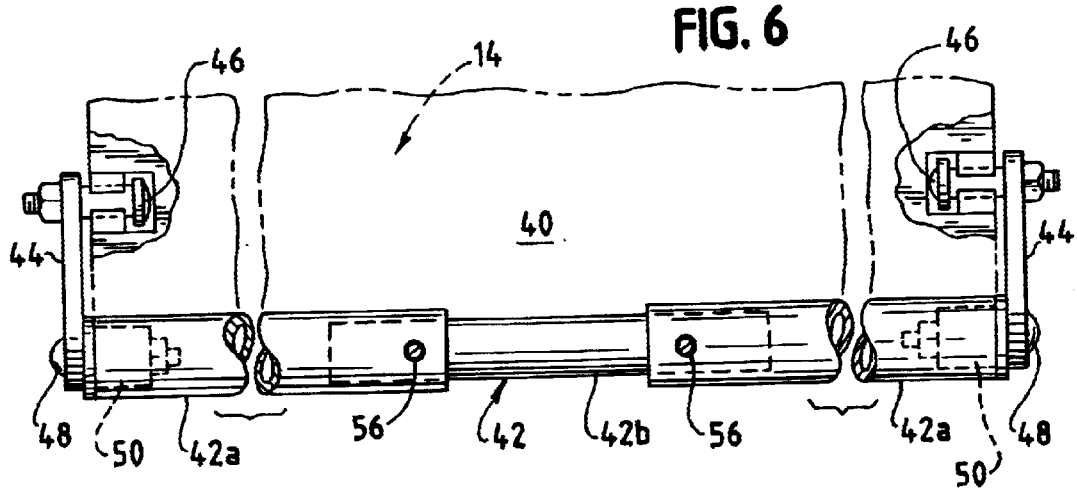
FIG. 6 is plan view of the ramp anchor of FIG. 5 with portions of the bar broken away.
Figure 7:
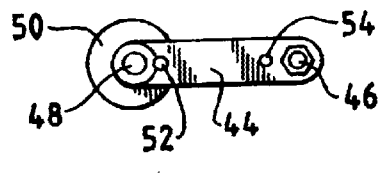
FIG. 7 is an end view of the ramp anchor of FIG. 6.

A second embodiment 40 of the ramp anchor is shown in FIGS. 5–7. Anchor bar 42 is a round tube with two identical end sections 42a which are telescoped with center section 42b. Anchor bar 42 lies on the upper surface 22 of tailgate 14, along outer edge 24. Ramp 16 has a hook 18 which engages bar 42.

End members 44 pivoted to bar end sections 42a have latch pins 46 at the inner ends thereof, which are received in the tailgate latches (not shown in FIGS. 5–7). Bolts 48 connect end members 44 with plugs 50 in the ends of tube end sections 42a. End members 44 pivot about the longitudinal axis of anchor bar 42 and extend downwardly along the ends of the tailgate 14 to engage the tailgate latches.

Alternate holes 52, 54 in end members 44 accommodate bolt 48 and latch pin 46, respectively, to adjust the effective length of end member 44 to match the spacing of the tailgate latch from the outer edge of 24 of the tailgate.

Screws 56 secure the anchor bar end sections 42a with the center section with a length adjustment to match the tailgate width.

I claim:

1. A ramp anchor for a vehicle having a tailgate which in a lowered, generally horizontal position has an outer edge bounded by two ends, each end having a latch spaced below an upper tailgate surface, the anchor comprising:
   a bar to rest on the upper surface of the tailgate along said outer edge, for engagement by a hook on a ramp; and
   end pieces at each end of and extending below the anchor bar along the ends of the tailgate for engagement with the tailgate latches.

2. The ramp anchor of claim 1 in which said tailgate has pin latches and said end pieces each have a latch pin spaced from the bar for engagement with a tailgate latch.

3. The ramp anchor of claim 2 in which said end pieces are pivoted to the bar and further comprising an adjustable stop on each end piece, between the rod and latch pin, for engagement with the end of the tailgate.

4. The ramp anchor of claim 1 in which said bar is adjustable in length.

5. The ramp anchor of claim 4 in which said bar comprises two telescoped sections.

6. The ramp anchor of claim 1 in which said bar is a tube with a square cross section.

7. The ramp anchor of claim 1 in which said bar is a tube with a round cross section.

8. A ramp anchor for a vehicle having a tailgate which in a lowered, generally horizontal position has an outer edge bounded by two ends, each end having a latch spaced below an upper tailgate surface, the anchor comprising:

a bar to rest on the upper surface of the tailgate along said outer edge, for engagement by a hook on a ramp; and end pieces pivoted at each end of the anchor bar to extend along an end of the tailgate for engagement with a tailgate latch.

9. The ramp anchor of claim 8 in which said end pieces are below said bar and pivoted thereto about axes at right angles to the surface of the tailgate.

10. The ramp anchor of claim 8 in which said end pieces are pivoted to the ends of said bar along the axis of the bar for movement in planes at right angles to the upper surface of the tailgate.

11. The ramp anchor of claim 9 for a tailgate having pin latches, the end pieces each having a pin remote from the bar for engagement with the latch and further comprising an adjustable stop on each end piece between the rod and the pin, for engagement with an end of the tailgate.

12. A ramp anchor for a vehicle having a tailgate which, in a lowered, generally horizontal position, has an outer edge bounded by two ends, each end having a latch, the anchor comprising:

a bar of adjustable length to rest on the upper surface of the tailgate along said outer edge, for engagement by a hook on a ramp; and end pieces at each end of the anchor bar to extend along the ends of the tailgate for engagement with the tailgate latches.

13. The ramp anchor of claim 12 in which the adjustable length bar has two telescoped sections.

14. The ramp anchor of claim 12 in which said bar is a tube with a square cross section.

15. The ramp anchor of claim 12 in which said bar is a tube with a round cross section.

16. The ramp anchor of claim 4, the bar having two identical end sections both telescoped with a center section.

17. The ramp anchor of claim 10 in which said bar is tubular and further comprising a plug in each end of the bar, said end pieces being pivoted to said plugs.

* * * * *

UNITED STATES PATENT AND TRADEMARK OFFICE
CERTIFICATE OF CORRECTION

PATENT NO. : 6,692,055 B2
DATED : February 17, 2004
INVENTOR(S) : Harold M. Schilling It is certified that error appears in the above-identified patent and that said Letters Patent is hereby corrected as shown below:

Column 2,
Line 42, delete "(not shown in FIGS. 5-7)".
Line 50, delete the word "of" after "edge".
Line 52, after "section" insert -- 42b --.

Signed and Sealed this

First Day of June, 2004

JON W. DUDAS
*Acting Director of the United States Patent and Trademark Office*